April 5, 1966  A. N. KARAVIAS  3,243,923
PROCESS FOR CUTTING A SCREW
Filed Sept. 24, 1965  2 Sheets-Sheet 1

April 5, 1966  A. N. KARAVIAS  3,243,923
PROCESS FOR CUTTING A SCREW
Filed Sept. 24, 1965  2 Sheets-Sheet 2

United States Patent Office 3,243,923
Patented Apr. 5, 1966

3,243,923
PROCESS FOR CUTTING A SCREW
Alexander N. Karavias, 21a Aristotelous St.,
Athens, Greece
Filed Sept. 24, 1965, Ser. No. 490,035
Claims priority, application Greece, Aug. 10, 1962,
25,839; Oct. 31, 1962, 26,163; Nov. 29, 1962, 26,298
4 Claims. (Cl. 51—288)

This application is a continuation-in-part of my application Serial No. 297,853, filed July 26, 1963.

The invention relates in general to processes for the manufacture of fluid propellers and in particular to a process for the manufacture of a screw for a hydraulic machine.

Screws which are mounted in closely fitted cylindrical casings in hydraulic machines require for maximum efficiency of operation, for example in pumping fluids, that the volume of the screw be small in relation to the volume of the cylindrical casing, surrounding the screw, so that the major portion of the casing is occupied by the fluid being pumped. Screws manufactured by conventional processes have grooves or channels of a depth less than the radius of the screw with the result that the volume of the screw occupies a large portion of the cylindrical casing surrounding the screw. In hydraulic machines where a screw is meshed with a toothed wheel, it is necessary that the grooves of the screw closely fit the tooth shape of the toothed wheel in order to minimize the flow of fluid between the toothed wheel and the screw.

An object of this invention is to provide a process for the manufacture of a screw having a small volume in relation to the volume of the cylinder described by the overall diameter of the screw and the length of the screw.

Another object of this invention is to provide a process for the manufacture of a screw having grooves of selected depth greater than the radius of the screw.

Another object of this invention is to provide a process for the manufacture of a screw having grooves closely fitting a toothed wheel having substantially circular teeth.

Another object of this invention is to provide a process for the manufacture of a screw having grooves closely fitting a toothed wheel having substantially circular teeth and having the grooves disposed so as to permit the toothed wheel to penetrate the screw to a depth greater than the radius of the screw.

Another object of this invention is to provide a process for the manufacture of a screw having grooves with reentrant portions.

Other objects and a fuller understanding of the invention may be had by referring to the following description and claims, taken in conjunction with the accompanying drawing in which:

Figure 1:
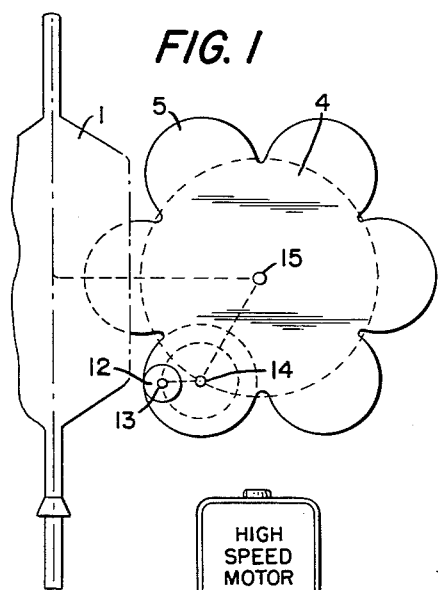
FIG. 1 is an overall view illustrating the manufacture of a screw according to the invention.

With reference to FIG. 1 the process for the manufacture of a screw, in accordance with the invention, employs a circular cutter 12 which is rotated about its axis 13 and simultaneously about a shaft 14. The axis 13 and the shaft 14 may be coincident but in any case the cutting circle of the cutter 12 about shaft 14 is set in accordance with the diameter of the teeth 5. Shaft 14 is simultaneously rotated about a shaft 15 at a radius depending on the required size of the wheel 4. The screw shaft S is rotated synchronously with the circular movement of the cutter 12 about the shaft 15. The necessary relation between the rotations of the screw shaft and the other shafts is maintained, for example, by trains of gears (not shown) interconnecting the various shafts. The relation of the turns of the screw shaft and the relative circular displacement of the cutter about shaft 15 is determined in dependence on the pitch of the screw and the number of blades on the screw in relation to the number of teeth on wheel 4.

The distance between shaft 15 and the axis of the screw shaft S is set in dependence on the required depth of penetration of the blades 5 into the screw. The planes of the various rotations are coincident or parallel with the axis of the screw.

Figure 3:
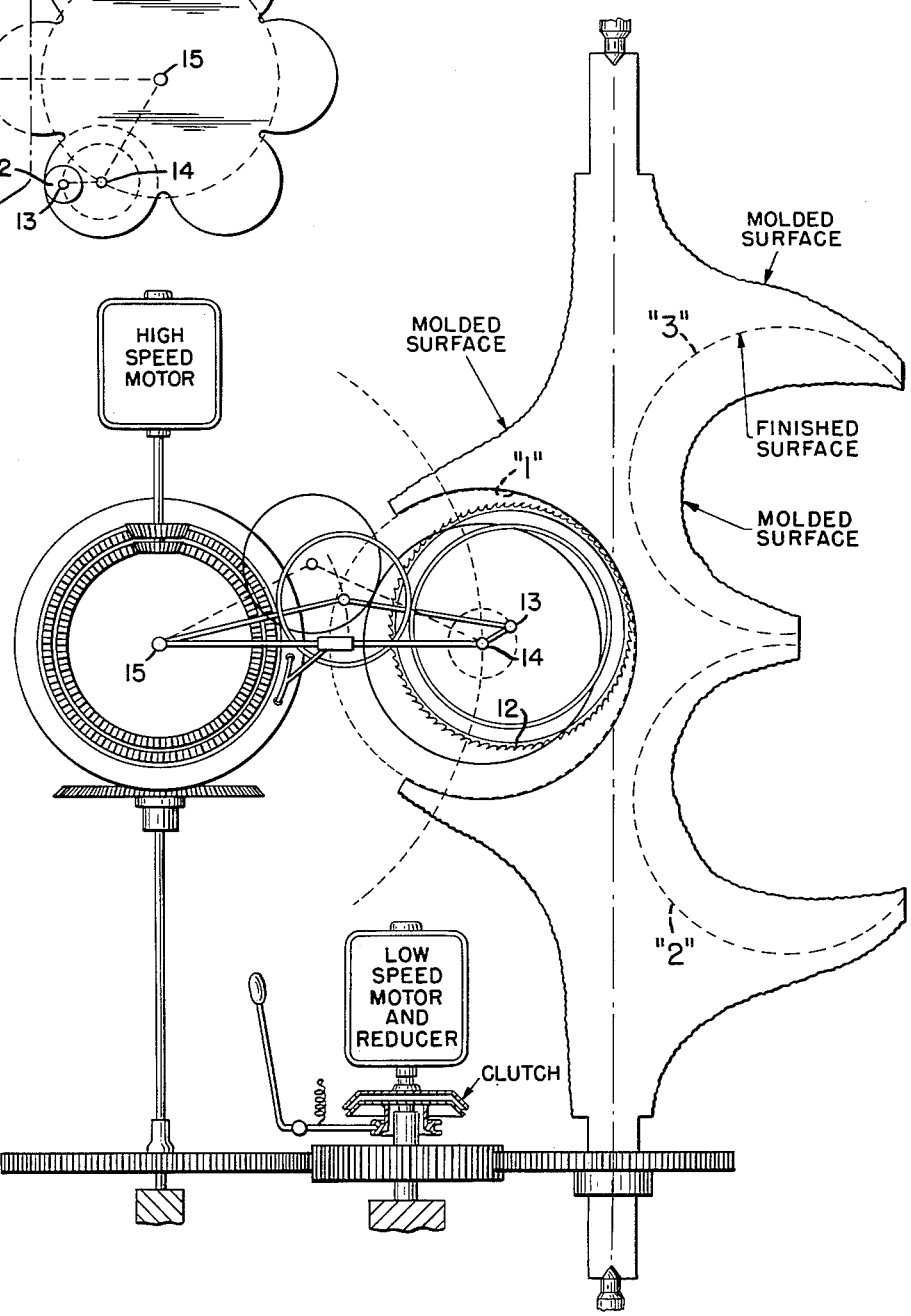
FIG. 3 is a detailed view of the manufacture of a screw from a molded blank.

FIG. 3 illustrates by way of example a particular arrangement of gear trains and linkages for maintaining the geometrical and synchronous relationships between the cutter and the blank that are shown in FIG. 1.

Figure 2A:
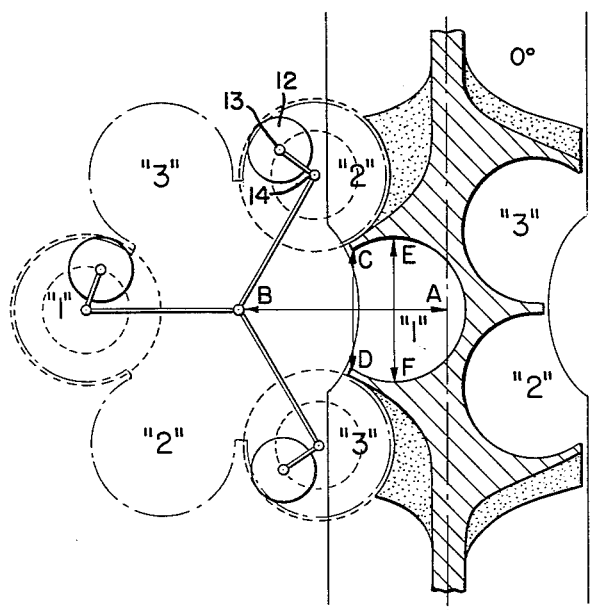
FIGS. 2A to 2E are a series of sectional views taken along the axis of a three start screw manufactured from a cylindrical blank.
Figure 2B:
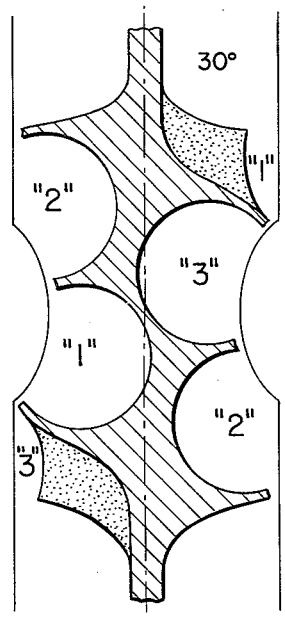
Figure 2C:
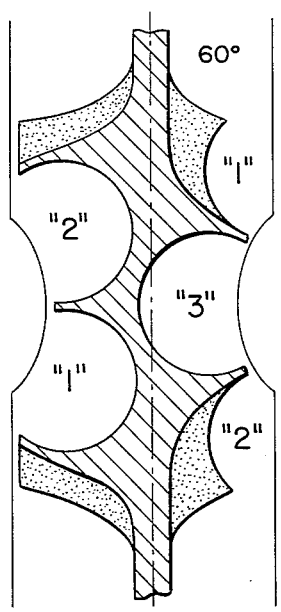
Figure 2D:
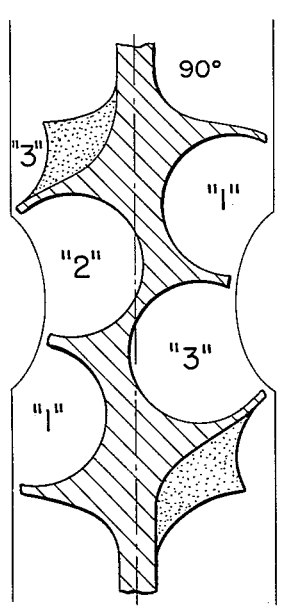
Figure 2E:
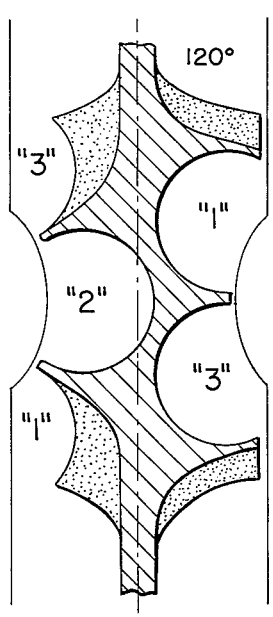

FIGS. 2A to 2E illustrate the ability of the process to produce a screw having a groove or channel with selected portions of the groove reentrant in form and with selected portions of the groove having a depth greater than the radius of the screw. In FIG. 2A the distance A—B is such that the orbit of the cutting wheel lies more than halfway inside the periphery of the work piece or blank. The diameter E—F of the groove or cavity cut in the work piece is greater than the opening C—D. The bottoms of successive portions of the cavity cut in the work piece lie on an arc the center of which is B. The bottom of the portion of the cavity designated 1 in FIG. 2A extends beyond the center line of the workpiece while the portions of the cavities designated 2 and 3 are spaced a substantial distance from the center line. This results from the fact that the grinding wheels, or other cutters, while revolving about their own axes and about the centers at the ends of the radial arms also travel in an orbit about the center B.

FIGS. 2A to 2E show successive cross sections taken through the axis of a three start screw, manufactured from a cylindrical blank, at 0°, 30°, 60°, 90°, and 120° of rotation of the screw respectively. The edges of the cross hatched areas in FIGS. 2A to 2E represent surfaces which have been formed by the action of the cutter 12 of FIG. 1. The grey stippled areas represent surfaces which are not reached by the cutter 12 and are superfluous and objectionable in that they restrict the free part of the groove and tend to prevent the free flow of fluid along the groove. It is desirable that the grey stippled areas be removed so that the screw does not restrict the flow of fluid. The grey stippled areas can be removed without the requirement of any exactness in the process of the finishing of these areas as these areas do not approach the blades 5 of the bladed wheel 4 of FIG. 1.

A preferred process for the manufacture of the screw is to first make an ordinary screw blank having the grey stippled areas removed by means of molding or a conventional machining process such as turning on a lathe and having narrow grooves of small depth and of an intermediary form, and then finishing the grooves to the final form using the process shown in FIGURES 1 and 2A to 2E. Means for carrying out this process is shown schematically in FIG. 3 wherein a molded workpiece having non-reentrant grooves is shown being finished to a final form having reentrant grooves through the action of a circular cutter 12 which is rotated about its axis 13 and simultaneously rotated about a shaft 14. Shaft 14 is simultaneously rotated about a shaft 15.

As an alternative, the screw may be manufactured according to the process shown in FIGS. 1 and 2A to 2E from a cylindrical blank and the grey stippled areas shown in FIGS. 2A to 2E removed during a subsequent operation by means of a conventional machining or metal working process such as grinding.

Although the invention has been described with a certain degree of particularity, it is understood that the present disclosure has been made only by way of example and that numerous changes in the details of the process and the combination and arrangement of parts for the performance of the process may be resorted to without departing from the spirit and the scope of the invention as hereinafter claimed.

What I claim and desire to secure by Letters Patent is:

1. A process for cutting a screw for a hydraulic machine which comprises providing a blank having a central generally cylindrical portion and coaxial shaft portions extending at opposite ends of said cylindrical portion, mounting a rotating cutter to travel bodily about an orbital axis in an orbital path lying in an axial plane of said blank while simultaneously rotating on its own axis, bringing said cutter into cutting engagement with said blank and simultaneously rotating said blank about its axis, rotating said cutter on its axis and orbiting said cutter about said orbital axis in predetermined relation to the rotation of said blank to cut in said blank a helical channel having a substantially semi circular cross sectional shape when viewed in an axial section of said blank, said cross sectional shape having a radius equal to the radius of a circle defined by said cutter in rotating about its said axis.

2. A process according to claim 1, in which said cutter moves in a suborbital path about an axis which moves in an orbital path about said orbital axis.

3. A process according to claim 1, in which said blank is initially provided with a helical channel and said blank is positioned with respect to said cutter so that the steps of claim 1 serve to enlarge said helical channel.

4. A process according to claim 1, in which selected end portions of said blank are removed by a separate machining operation to reduce the total volume of said screw.

References Cited by the Examiner
UNITED STATES PATENTS

| | | | |
|---|---|---|---|
| 1,243,767 | 10/1917 | Schurr et al. | 51—287 X |
| 1,751,540 | 3/1930 | Cone | 90—3 |
| 1,833,993 | 12/1931 | Hill | 90—3 |
| 2,792,763 | 5/1957 | Whitfield | 90—3 |

LESTER M. SWINGLE, *Primary Examiner.*